United States Patent
Al-Shyoukh et al.

(10) Patent No.: US 9,425,682 B2
(45) Date of Patent: Aug. 23, 2016

(54) START-UP CIRCUIT AND METHOD FOR AC-DC CONVERTERS USING A DEPLETION MODE TRANSISTOR

(75) Inventors: Mohammad Al-Shyoukh, Cedar Park, TX (US); Percy Neyra, Austin, TX (US)

(73) Assignee: TAIWAN SEMICONDUCTOR MANUFACTURING COMPANY, LTD. (TW)

(*) Notice: Subject to any disclaimer, the term of this patent is extended or adjusted under 35 U.S.C. 154(b) by 563 days.

(21) Appl. No.: 13/598,288

(22) Filed: Aug. 29, 2012

(65) Prior Publication Data

US 2014/0063875 A1    Mar. 6, 2014

(51) Int. Cl.
*H02M 1/36*    (2007.01)
*H02M 3/335*   (2006.01)
*H05B 33/08*   (2006.01)

(52) U.S. Cl.
CPC ........... *H02M 1/36* (2013.01); *H02M 3/33523* (2013.01); *H05B 33/0815* (2013.01)

(58) Field of Classification Search
CPC ...... H02M 7/217; H02M 7/219; H02M 7/19; H02M 7/162; H02M 3/315; H02M 3/33523

USPC ....... 363/131, 132, 133, 134, 135, 136, 137, 363/138, 139, 49
See application file for complete search history.

(56) References Cited

U.S. PATENT DOCUMENTS 5,459,652 A * 10/1995 Faulk ............................. 363/49
5,745,358 A *  4/1998 Faulk ............................. 363/95

* cited by examiner

*Primary Examiner* — Harry Behm
*Assistant Examiner* — Peter Novak
(74) *Attorney, Agent, or Firm* — Hauptman Ham, LLP

(57) ABSTRACT

An AC-DC power converter includes a rectifying unit for generating a rectified voltage, an output stage for converting the rectified voltage into a DC voltage for a load, a controller for controlling the output stage, and a start-up circuit. The start-up circuit includes a first power section coupled to the rectifying unit and configured to generate a first voltage from the rectified voltage and to output the first voltage to the controller to enable the controller before the output stage starts outputting power. The first power section includes a depletion mode transistor having a first terminal configured to receive the rectified voltage and a second terminal configured to output the first voltage.

20 Claims, 4 Drawing Sheets

START-UP CIRCUIT AND METHOD FOR AC-DC CONVERTERS USING A DEPLETION MODE TRANSISTOR

BACKGROUND

AC-DC power converters are used in many applications, including consumer electronics, LED lighting, and other kinds of electrical or electronic devices. In a typical application, the AC-DC power converter produces a regulated DC output from an AC input which comes from the utility grid. The regulated DC output is either a voltage as in power supply applications, or a current as in emerging LED lighting applications.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
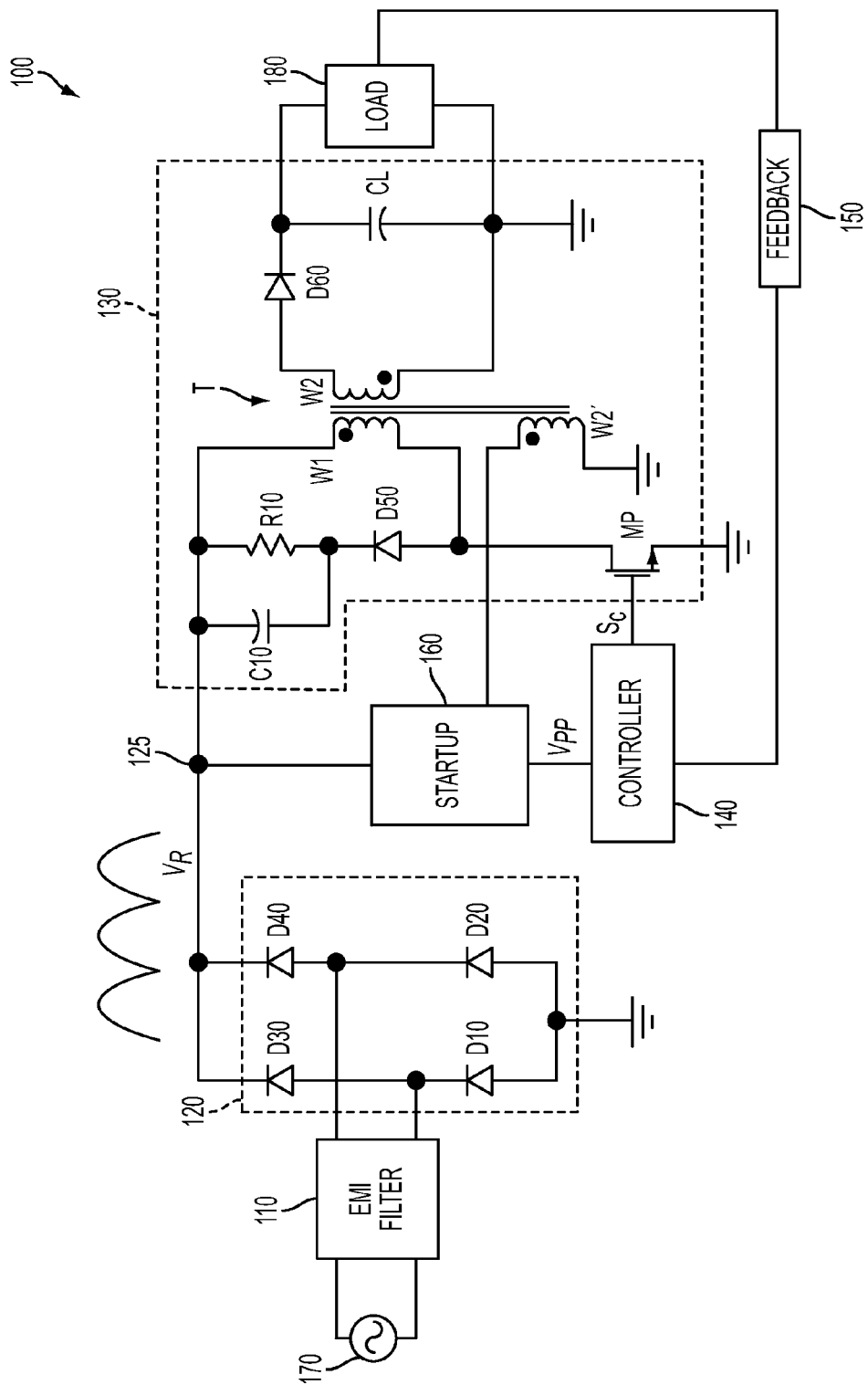
FIG. 1 is a schematic circuit diagram of a power converter in accordance with some embodiments.

It is understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent; however, that one or more embodiments may be practiced without these specific details. Like reference numerals in the drawings denote like elements.

Some embodiments describe a start-up circuit for and a method of starting up a power converter. The start-up circuit and/or the method use(s) a depletion mode transistor for generating a first voltage which enables a controller of the power converter in a start-up phase, i.e., before an output stage of the power converter starts outputting power. After the controller is enabled, the controller controls the output stage to output power which generates a second voltage. In some embodiments, a maximum selector circuit selects the higher of the first and second voltages, and outputs the selected voltage to the controller. Thus, a handoff from the start-up phase, i.e., the time period in which the controller is enabled and powered by the first voltage, to a steady-state phase, i.e., the time period in which the controller is powered by the second voltage, is performed. The described technique is suitable for high voltage applications in accordance with one or more embodiments.

FIG. 1 is a schematic circuit diagram of a power converter 100 in accordance with some embodiments. The power converter 100 includes an electromagnetic interference (EMI) filter 110, a rectifying unit 120, an output stage 130, a controller 140, a feedback circuit 150, and a start-up circuit 160. In some embodiments, the power converter 100 is implemented wholly or partly on a single integrated circuit (also referred to as chip), or on a multi-chip structure. In some embodiments, one or more components of the power converter 100 are configured as discrete components and are mounted on a printed circuit board (PCB) having conductive traces that connect the discrete components to the chip or chips containing the remaining components.

The EMI filter 110 is coupled to a power source 170. In one or more embodiments, the power source 170 is an AC power source, such as the utility grid. The EMI filter 110 include one or more passive and/or active electronic components configured to suppress EMI from the power source 170 from affecting operation of the other components of the power converter 100. In one or more embodiments, the EMI filter 110 is further configured to provide surge protection for the other components of the power converter 100. In one or more embodiments, the EMI filter 110 is omitted from the power converter 100.

The rectifying unit 120 is coupled to the power source 170, either directly or indirectly via the EMI filter 110, to receive power to be converted. The rectifying unit 120 is configured to output a rectified voltage $V_R$ from the power received from the power source 170. In one or more embodiments, the rectifying unit 120 includes diodes D10-D40 connected with each other to define a full-wave rectifier. Other configurations of the rectifying unit 120 are used in further embodiments.

The output stage 130 is coupled to an output 125 of the rectifying unit 120 and configured to convert, under control of the controller 140, the rectified voltage $V_R$ into a DC voltage for a load 180. The output stage 130 includes a transformer T having a primary winding W1 coupled to the output 125 of the rectifying unit 120 to receive the rectified voltage $V_R$, and at least one secondary winding W2 coupled to the load 180. The transformer T further includes an auxiliary secondary winding W2' to provide power for the controller 140.

On the primary winding (W1) side, the output stage 130 further includes a switch MP, a capacitor C10, a resistor R10 and a diode D50. In one or more embodiments, the switch MP includes a power field-effect transistor (FET). In further embodiments, the switch MP includes one or more other suitable devices, such as a bipolar junction transistor (BJT), a field effect transistor (FET), etc. The switch MP has a control terminal coupled to the controller 140 to receive a control signal Sc, and first and second terminals coupled to the ground and the primary winding W1. The primary winding W1 has opposite ends coupled to the rectifying unit 120 and the switch MP. The resistor R10 and diode D50 are coupled in series between the switch MP and the output 125 of the rectifying unit 120. The capacitor 10 is coupled in parallel with the resistor R10.

On the secondary winding (W2) side, the output stage 130 further includes a capacitor CL and a diode D60 which are coupled in series between opposite ends of the secondary winding W2 to form a loop. Other configurations of the output stage 130 are used in further embodiments.

The controller 140 generates the control signal (Sc) for controlling the switch MP to turn ON or OFF. After the switch MP is turned ON by the controller 140, a current flows from the rectifying unit 120, via the primary winding W1 and the switch MP, to the ground. Thus, energy supplied from the rectifying unit 120 is built up and stored in the primary winding W1. The built up energy is proportional to the ON time of the switch MP and the rectified voltage $V_R$. After the switch MP is turned OFF by the controller 140, the energy stored in the primary winding W1 is discharged via the diode D50, the capacitor C10 and the resistor R10, and is released into a load 180 via the secondary winding W2, the capacitor CL, and the diode D60. The use of the transformer T for energy transmission shields the load 180 from perturbations or glitches that are potentially present on the power source 170. In at least one embodiment, a frequency at which the controller 140 turns ON/OFF the switch MP is higher than a frequency of the power source 170. For example, the controller 140 turns ON/OFF the switch MP at about 200 kHz given the power source frequency of about 50 kHz.

The controller 140 further monitors the power outputted by the output stage 130 and controls the ON/OFF switching of the switch MP to maintain the outputted power at a desired level. The outputted power of the output stage 130 is detected by the feedback circuit 150 which provides an isolated, or non-isolated, feedback signal that is indicative of the detected outputted power. The feedback signal also allows the controller 140 to detect short circuits or other faults or malfunctions on the load side. In some embodiments, the controller 140 further includes circuitry to monitor operation of one or more other components of the power converter 100. For example, the controller 140 in at least one embodiment includes circuitry for monitoring the rectified voltage $V_R$. In at least one embodiment, the monitoring circuitry is provided for such functionality as power sequencing and controller enabling, while ensuring that the controller is in a proper state vis-a-vis the behavior of the rectified voltage $V_R$. In at least one embodiment, the monitoring circuitry becomes fully functional and produces a valid signal from the earliest or smallest possible level of the rectified voltage $V_R$.

The start-up circuit 160 is coupled to the output 125 of the rectifying unit 120, the controller 140, and the auxiliary secondary winding W2' of the transformer T. Upon power-up of the power converter 100, the start-up circuit 160 receives the rectified voltage $V_R$ from the rectifying unit 120, and generates a voltage $V_{PP}$ based on the rectified voltage $V_R$. The voltage $V_{PP}$ is outputted to the controller 140 to enable the controller 140 to start the ON/OFF switching of the switch MP. As the switch MP starts switching, the output stage 130 starts outputting power to the load 180 via the secondary winding W2. The power outputted by the output stage 130 is also supplied via the auxiliary secondary winding W2' to the start-up circuit 160. After the power supplied by the output stage 130 via the auxiliary secondary winding W2' reaches a predetermined level, the start-up circuit 160 outputs the voltage $V_{PP}$ based on the power supplied by the output stage 130 for powering further operation of the controller 140. In this aspect, the start-up circuit 160 is configured not only to provide temporary power for enabling the controller 140, but also to perform power management for the controller 140.

Figure 2:
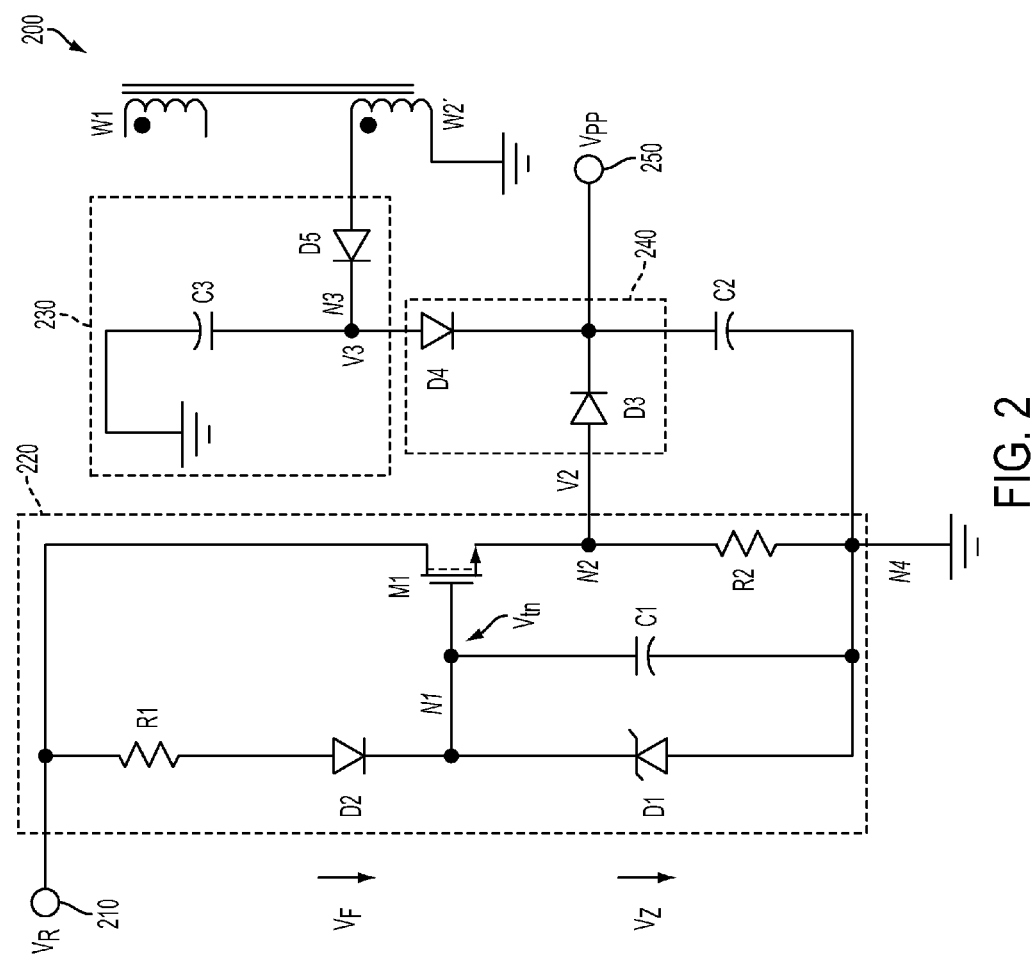
FIG. 2 is a schematic circuit diagram of a start-up circuit in accordance with some embodiments.

FIG. 2 is a schematic circuit diagram of a start-up circuit 200 in accordance with some embodiments. The start-up circuit 200, in one or more embodiments, is usable as the start-up circuit 160 in the power converter 100. The start-up circuit 200 includes an input node 210, a first power section 220, a second power section 230, a selector 240, and an output node 250. The input node 210 is coupled to the output 125 of the rectifying unit 120 to receive the rectified voltage $V_R$ from the rectifying unit 120. The first power section 220 is coupled to the input node 210 and configured to generate a first voltage $V_2$ from the rectified voltage $V_R$ and to output the first voltage $V_2$ to the controller 140 via the output node 250 to enable the controller 140 before the output stage 130 starts outputting power. The second power section 230 is coupled to the output stage 130, via the auxiliary secondary winding W2', and configured to generate a second voltage $V_3$ from power supplied by the output stage 130 after the output stage 130 starts operating. The selector 240 is coupled to the first power section 220 and the second power section 230, and configured to select and output the higher of the first and second voltages $V_2$ and $V_3$, as the voltage $V_{PP}$ and via the output node 250, to the controller 140.

The first power section 220 includes a transistor M1, a first diode D1, a second diode D2, a first capacitor C1, a first resistor R1, and a second resistor R2. The transistor M1 has a gate terminal coupled to a first node N1, a first terminal coupled to the input node 210, and a second terminal coupled to a second node N2. For example, the drain of the transistor M1 is coupled to the input node 210, and the source of the transistor M1 is coupled to the second node N2. The transistor M1 is a transistor configured to operate in the depletion mode, and is also referred to herein as the depletion mode transistor M1. In one or more embodiments, the depletion mode transistor M1 is an N-channel depletion FET (or an n-type depletion FET) that has a negative threshold voltage $V_{th}$, unlike standard enhancement mode n-type FETs which have a positive threshold voltage. Other types of transistor are usable as the depletion mode transistor M1 in further embodiments. In at least one embodiment, the depletion mode transistor M1 has a universal power-grid-compatible voltage rating of about 400 to about 800 V.

The first diode D1 is a zener diode that has a cathode coupled to the gate terminal of the depletion mode transistor M1 via the first node N1, and an anode coupled to a reference node N4. The first diode D1, also referred to herein as the zener diode D1, has a reverse zener voltage $V_Z$. The reference node N4 is a node having a reference voltage, such as ground.

The first capacitor C1 is coupled in parallel with the zener diode D1. The second diode D2 and the first resistor R1 are coupled in series between the gate terminal of the depletion mode transistor M1 and the input node 210. For example, one end of the first resistor R1 is coupled to the input node 210, another end of the first resistor R1 is coupled to an anode of the second diode D2, and a cathode of the second diode D2 is coupled to the gate terminal of the depletion mode transistor M1 via the first node N1. The second diode D2 has a forward voltage $V_F$. The second resistor R2 is coupled between the second terminal, e.g., the source, of the depletion mode transistor M1 and the reference node N4. A second capacitor C2 is also coupled between the output node 250 and the reference node N4.

The selector 240 includes a third diode D3 and a fourth diode D4. The third diode D3 has a cathode coupled to the output node 250, and an anode coupled to the second terminal of the depletion mode transistor M1 via the second node N2. The fourth diode D4 has a cathode coupled to the output node 250, and an anode coupled to the second power section 230 via a third node N3. Other configurations for the selector 240 are used in further embodiments. For example, in at least one embodiment, one or both of the third diode D3 and fourth diode D4 is/are implemented as a plurality of diodes coupled in series.

The second power section 230 includes a third capacitor C3 and a fifth diode D5. The fifth diode D5 has a cathode coupled to the anode of the fourth diode D4, and an anode configured to receive power from the output stage 130. For example, the anode of the fifth diode D5 is coupled to an end of the auxiliary secondary winding W2', the other end of the auxiliary secondary winding W2' being grounded. The third capacitor C3 is coupled between the cathode of the fifth diode D5 and the reference node N4. Other configurations of the second power section 230 are used in further embodiments.

Figure 3:
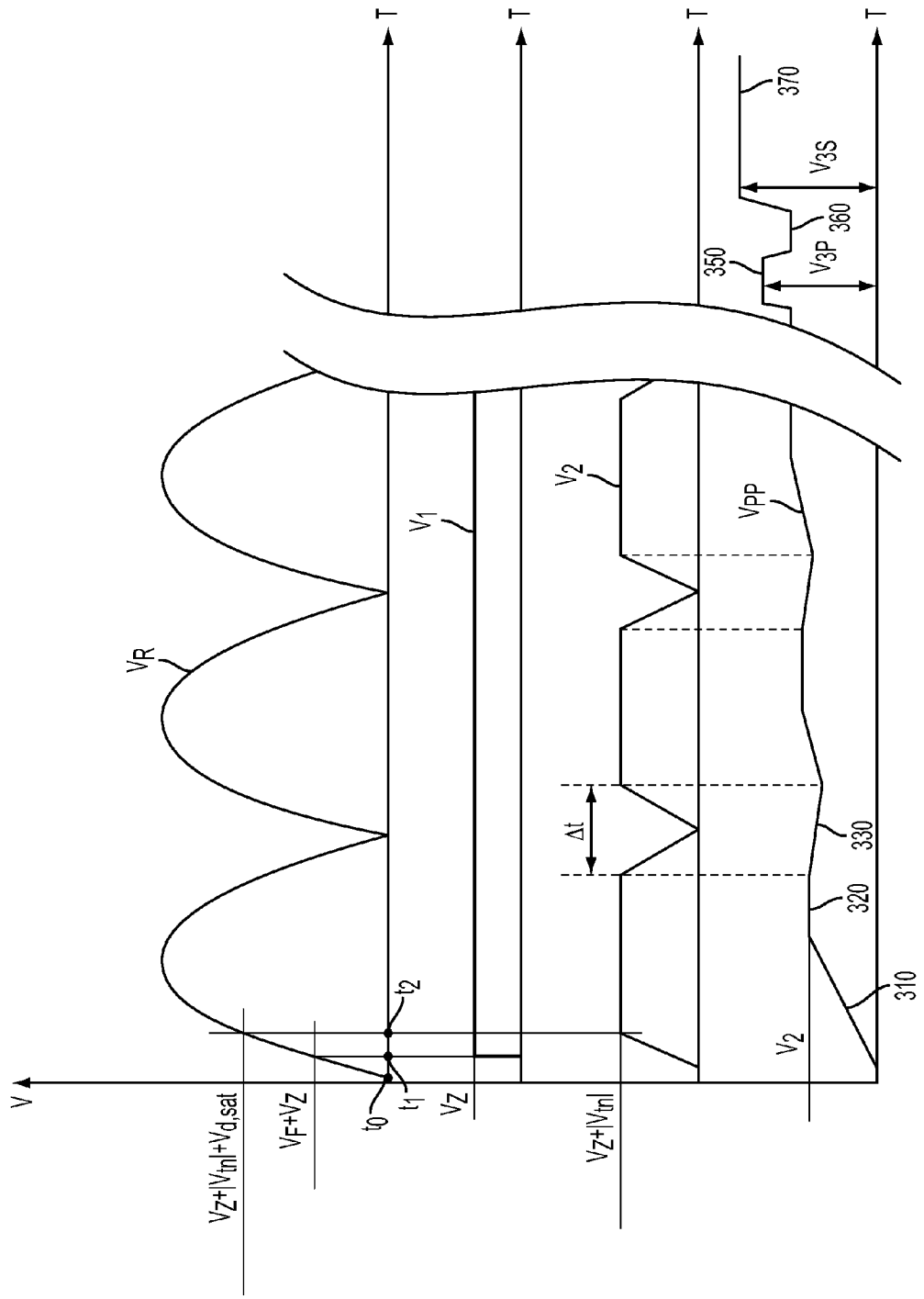
FIG. 3 is a timing diagram of the operation of a start-up circuit in accordance with some embodiments.

The operation of the start-up circuit 200 will now be described with reference to both FIG. 2 and FIG. 3. FIG. 3 is a timing diagram of the operation of the start-up circuit 200 in accordance with some embodiments. It should be noted that FIG. 3 is not drawn to scale. Further, for the sake of simplicity, it is assumed in the following description that the diodes D2-D5 have the same forward voltage $V_F$. However, diodes having different forward voltages are usable as one or more of diodes D2-D5 in various embodiments.

Upon power-up of the power converter 100, the rectifying unit 120 starts outputting the rectified voltage $V_R$, as indicated at time $t_0$ in FIG. 3. The rectified voltage $V_R$ is supplied via the input node 210 to the first power section 220. The first resistor R1, the second diode D2 and the zener diode D1 provide a current path from the input node 210 to the gate terminal of the depletion mode transistor M1. As the rectified voltage $V_R$ exceeds the forward voltage $V_F$ of the second diode D2, the voltage $V_1$ at the first node N1 starts to rise with the rectified voltage $V_R$. As the rectified voltage $V_R$ exceeds $V_F+V_Z$, as indicated at time $t_1$ in FIG. 3, the voltage V1 at the first node N1 will reach $V_Z$, and stay at that level even though the rectified voltage $V_R$ continues to rise.

The first capacitor C1 is selected to have a sufficient capacitance for holding charge and maintaining the voltage $V_1$ at about $V_Z$ during periods when the rectified voltage $V_R$ drops below $V_F+V_Z$. Further, when the rectified voltage $V_R$ drops below $V_F+V_Z$, the second diode D2 provides a reverse blocking function by preventing the charge on the first capacitor C1 from discharging back to the input node 210. The first resistor R1 is a current limiting resistor that provides a current-limited path from the input node 210 to the zener diode D1. The purpose of the current flowing through the first resistor R1 is to establish the gate bias for the depletion mode transistor M1 at $V_Z$. In at least one embodiment, the current flowing through the first resistor R1 is kept small, by selecting the first resistor R1 of a sufficiently large resistance, to minimize power consumption of the start-up circuit 160.

The circuitry including the first resistor R1, the second diode D2, the zener diode D1 and the first capacitor C1 forms a voltage regulator that provides a constant voltage $V_Z$ for biasing the gate terminal of the depletion mode transistor M1 from time $t_1$ through subsequent operations of the power converter 100. Other circuits for providing a constant voltage at the gate terminal of the depletion mode transistor M1 are used in further embodiments.

The depletion mode transistor M1 has the first terminal, e.g., the drain, configured to receive the rectified voltage $V_R$ via the input node 210, and the second terminal, e.g., the source, configured to output a first voltage $V_2$ via the second node N2 to the controller 140 to enable the controller 140 before the output stage 130 starts outputting power. The depletion mode transistor M1 functions as a source follower that delivers power to the second capacitor C2 through the third diode D3. Specifically, as indicated in FIG. 3, the first voltage $V_2$ at the source of the depletion mode transistor M1 follows the rectified voltage $V_R$ at the drain of the depletion mode transistor M1, and rises together with the rectified voltage $V_R$ during a first rising edge 301 of the rectified voltage $V_R$. When the rectified voltage $V_R$ exceeds the sum of $V_Z+|V_{tn}|+V_{d,sat}$, as indicated at time $t_2$ in FIG. 3, the first voltage $V_2$ is equal to $V_Z+|V_{tn}|$. The voltage $V_{d,sat}$ is a minimum drain-source overdrive voltage at which the depletion mode transistor M1 enters the saturation region. When the rectified voltage $V_R$ is at or below $V_Z+|V_{tn}|+V_{d,sat}$, as indicated at $\Delta t$ in FIG. 3, the first voltage $V_2$ again tracks the rectified voltage $V_R$ as the depletion mode transistor M1 leaves the saturation region and enter into the linear region. The second resistor R2 is selected to set a minimum current through the source follower to maintain a predetermined bandwidth for the source follower and improve the transient recovery of the source follower.

The period $\Delta t$ during which the first voltage $V_2$ is below the level $V_Z+|V_{tn}|$ is small compared to the period during which the first voltage $V_2$ is at the level $V_Z+|V_{tn}|$. For example, in at least one particular embodiment, the peak level of the rectified voltage $V_R$ is about 240 V, $V_Z$ is about 10 V, $|V_{tn}|$ is about 3-4 V, $V_F$ is about 0.7 V, and $V_{d,sat}$ is about 0.2 V. In the particular embodiment, for most of the cycle, $V_R$ is greater than $V_Z+|V_{tn}|+V_{d,sat}$, i.e., greater than about 13.2-14.2 V. As a result, the first voltage $V_2$, for most of the cycle, is constant at the level of $V_Z+|V_{tn}|$ of about 13-14 V. In some embodiments, the first voltage $V_2$ is in a range of 12-15 V. The short periods $\Delta t$ during which the first voltage $V_2$ falls below the level of $V_Z+|V_{tn}|$ are insignificant compared to the periods during which the first voltage $V_2$ is at the level of $V_Z+|V_{tn}|$. As a result, a periodically intermittent start-up power rail of relatively good quality is provided at the second node N2.

Upon start-up of the power converter 100, the output stage 130 does not yet start outputting power. The first voltage $V_2$ is provided in this start-up phase to enable the controller 140 to start the switching ON/OFF of the switch MP in the output stage 130. The first voltage $V_2$ is outputted from the second node N2, via the third diode D3 and the output node 250 to the controller 140. In other words, the voltage $V_{PP}$ is about equal to $V_2$ (minus the forward voltage $V_F$ of the third diode D3) during the start-up phase.

As indicated in FIG. 3, during a first rising period 310, the voltage $V_{PP}$ starts rising with the first voltage $V_2$ and charges the second capacitor C2 via the third diode D3. During a subsequent period 320, the voltage $V_{PP}$ reaches a level of a diode forward voltage $V_F$ below the constant level $V_Z+|V_{tn}|$ of the first voltage $V_2$. During a period 330 corresponding to the period $\Delta t$ when the first voltage $V_2$ falls below the constant level of $V_Z+|V_{tn}|$, the voltage $V_{PP}$ drops slightly. The second capacitor C2 is selected to have a sufficient capacitance for holding charge and maintaining the voltage $V_{PP}$ at about the same level of $V_Z+|V_{tn}|-V_F$ during the period 320. In at least one embodiment, the second capacitor C2 is sufficiently large to sustain a ground current of the controller 140. In various embodiments, the short duration and the slight voltage drop of the period 330 are insignificant, and the voltage $V_{PP}$ is considered as a power rail of relatively high quality for enabling and powering the controller 140. The third diode D3 provides a reverse-blocking path between the output node 250 and the second node N2 to prevent the second capacitor C2 from discharging through the second resistor R2 after the first voltage $V_2$ drops below the voltage $V_{PP}$, e.g., during the period 330.

In at least one embodiment, the voltage $V_{PP}$ reaches the level (which is approximately equal to the constant level $V_Z+|V_{tn}|$ of the first voltage $V_2$ less a diode forward voltage $V_F$) within the first cycle of the rectified voltage $V_R$. In at least one embodiment, during the first rising edge 301 of the rectified voltage $V_R$, the voltage $V_{PP}$ reaches a level sufficient to enable at least one circuit of the controller 140. For example, during the first rising edge 301 of the rectified voltage $V_R$, the voltage $V_{PP}$ reaches a level sufficient to enable the circuitry that monitors the rectified voltage $V_R$.

After the controller 140 is enabled and starts the ON/OFF switching of the switch MP, the output stage 130 starts outputting power to the second power section 230 via the auxiliary secondary winding W2'. The energy released from the primary winding W1 (not shown in FIG. 2) to the auxiliary secondary winding W2' starts building up charge in the third capacitor C3 via the fifth diode D5. As a result, a second voltage $V_3$ at the third node N3 starts to rise. After a sufficient number of cycles has passed, the second voltage $V_3$ reaches a level that is higher than the maximum level of the first voltage $V_2$ at the output of the source follower. In some embodiments, this arrangement is achieved by selecting a proper winding ratio between the primary winding W1 and the auxiliary secondary winding W2'. The third capacitor C3 is selected to maintain the second voltage $V_3$ at a constant, steady-state level, thereby providing a steady-state power rail for the controller 140 at the third node N3 after the start-up phase. The fifth diode D5 provides a reverse-blocking function to prevent the energy or charge stored in the third capacitor C3 from discharging back to the auxiliary secondary winding W2' of the transformer T when the auxiliary secondary winding W2' is not delivering energy to the third capacitor C3.

The handoff mechanism between the start-up power rail, i.e., the first voltage $V_2$ at the second node N2, and the steady-state power rail, i.e., the second voltage $V_3$ at the third node N3, is achieved via the selector 240 which is a maximum selector that selects and outputs the higher of the first voltage $V_2$ and the second voltage $V_3$ to the output node 250 as the voltage $V_{PP}$. In other words, $V_{PP}=\max(V_2, V_3)-V_F$.

As the second voltage $V_3$ rises and exceeds the first voltage $V_2$, the fourth diode D4 of the selector 240 is forward-biased and delivers power from the second power section 230 to the output node 250, whereas the third diode D3 of the selector 240 is reverse-biased and stops conducting power from the first power section 220 to the output node 250. As a result, the voltage $V_{PP}$ is equal to the second voltage $V_3$. In some situations as indicated in FIG. 3, the second voltage $V_3$ reaches an intermediate level $V_{3p}$ that temporarily exceeds the first voltage $V_2$ but not yet reaches the higher steady-state level $V_{3s}$. In such situations, the voltage $V_{PP}$ becomes temporarily defined, as indicated at 350 in FIG. 3, by the intermediate level $V_{3p}$ of the second voltage $V_3$ before reverting back, as indicated at 360 in FIG. 3, to the level defined by the first voltage $V_2$. When the second voltage $V_3$ reaches the steady-state level $V_{3s}$, the voltage $V_{PP}$ is defined by that level, as indicated at 370 in FIG. 3, and remains at the steady-state level $V_{3s}$ during subsequent operations of the power converter 100. In at least one particular embodiment, the steady-state level of the second voltage $V_3$ is about 15-20 V.

Once the second voltage $V_3$ has reached the steady-state level that exceeds the maximum level of the first voltage $V_2$, the second power section 230 takes over the delivery of the voltage $V_{PP}$ to the output node 250, and acts as the power supply for the controller 140. The steady-state level of the second voltage $V_3$ provides a steady-state power rail that is more efficient than the start-up power rail provided by the first voltage $V_2$. After the second power section 230 takes over the delivery of the voltage $V_{PP}$ to the output node 250, the power dissipation through the first power section 220 is defined by the second resistor R2. The current through R2 is approximately given by $(V_Z+|V_{tn}|)/R2$ and is kept small, in at least one embodiment, to minimize power consumption of the start-up circuit 200.

In one or more embodiments, the use of the depletion mode transistor M1 provides good headroom performance and/or fast charge buildup on the voltage $V_{PP}$ during the start-up phase before the output stage 130 starts outputting power. The good headroom performance indicates a low level of the rectified voltage $V_R$ at which the voltage $V_{PP}$ (which is approximately slightly below the first voltage $V_2$) reaches a level sufficient to enable the controller 140. In at least one particular embodiment, after power-up of the power converter 100, as soon as the rectified voltage $V_R$ reaches a level of about 15-20V (i.e., under 10% of its peak level of about 240 V) during the first rising edge of the rectified voltage $V_R$, the voltage $V_{PP}$ is already at a level of a few volts that is sufficient to enable at least some circuits in the controller 140. The fast charge buildup on the voltage $V_{PP}$ indicates a short time for the voltage $V_{PP}$ (which is approximately equal to the first voltage $V_2$ less a diode forward voltage $V_F$) to reach the constant level of about $V_Z+|V_{tn}|-V_F$. In at least one particular embodiment, the voltage $V_{PP}$ or first voltage $V_2$ reaches the constant level within one or two cycles of the rectified voltage $V_R$ after the power-up of the power converter 100. The good headroom performance and/or fast charge buildup on the voltage $V_{PP}$ during the start-up phase ensure(s) that, in one or more embodiments, at least one, or most, or all circuits of the controller 140 is/are powered by the voltage $V_{PP}$ as soon as possible.

In one or more embodiments, the use of the selector 240 provides a smooth handoff from the start-up phase, when the controller is enabled and powered by the first voltage $V_2$, to the steady-state phase, when the controller is powered by the second voltage $V_3$. Thus, in at least one embodiment, a start-up power rail of relatively high quality provided by the first voltage $V_2$ is ensured during the start-up phase, whereas a steady-state power rail which is highly efficient is ensured during the subsequent, steady-state phase of the operation of the power converter 100.

Figure 4:
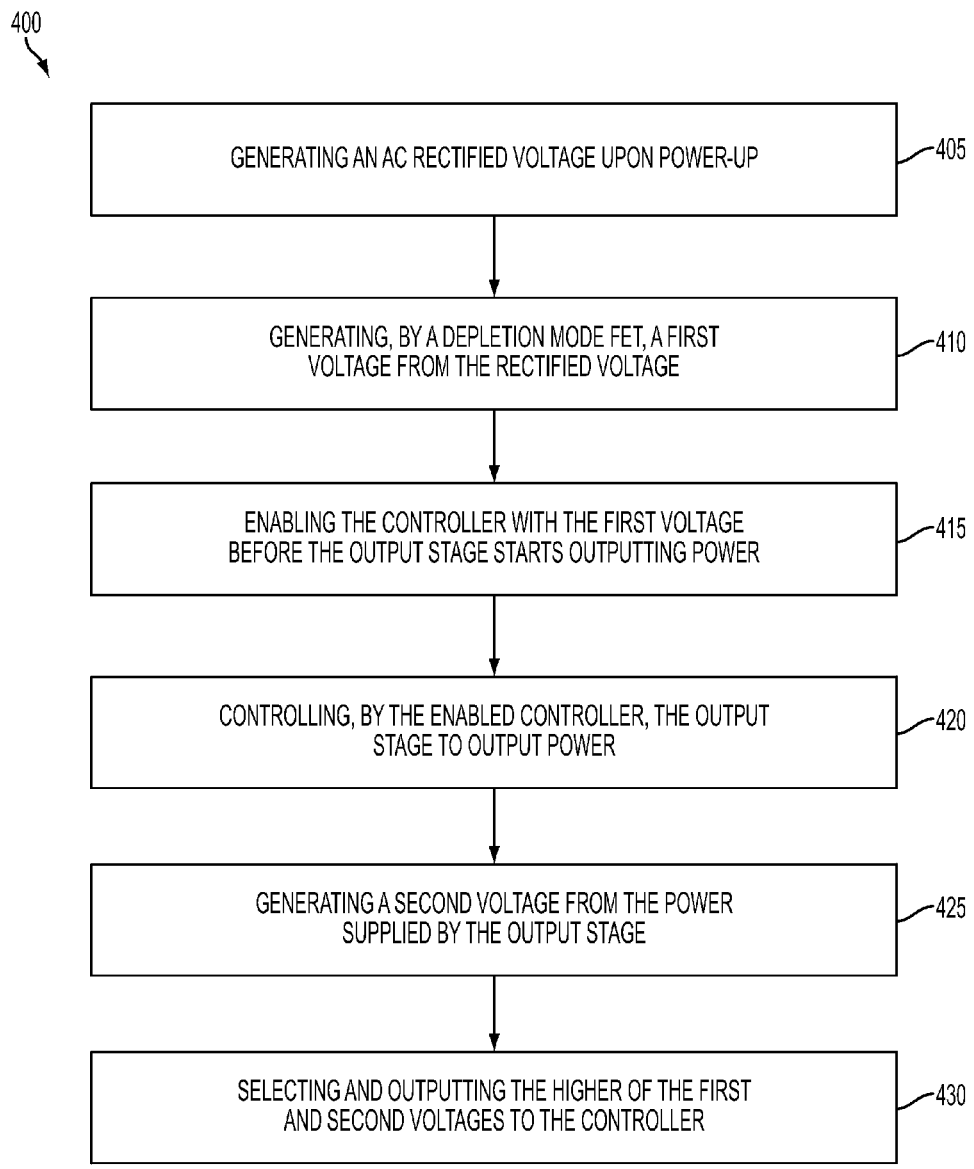
FIG. 4 is a flow chart of a method of starting-up a power converter in accordance with some embodiments.

FIG. 4 is a flow chart of a method of starting-up a power converter in accordance with some embodiments. In one or more embodiments, the method is performed by a start-up circuit, such as the start-up circuit 200 described herein, to start-up a power converter, such as the power converter 100 described herein.

At operation 405, an AC rectified voltage is generated upon power-up of the power converter. For example, the rectified voltage $V_R$ is generated upon power-up of the power converter 100, as described herein.

At operation 410, a first voltage is generated from the rectified voltage by a depletion mode FET. For example, the first voltage $V_2$ is generated from the rectified voltage $V_R$ by the depletion mode FET M1, as described herein.

At operation 415, a controller of the power converter is enabled by the first voltage, before an output stage of the power converter starts outputting power. For example, the controller 140 is enabled by the first voltage $V_2$ before the output stage 130 starts outputting power, as described herein.

At operation 420, the enabled controller controls the output stage to output power. For example, the controller 140, that has been enabled by the first voltage $V_2$, controls the switching ON/OFF of the switch MP to cause the output stage 130 to start outputting power, as described herein.

At operation 422, a second voltage is generated from the power supplied by the output stage. For example, the second voltage $V_3$ is generated from the power supplied by the output stage 130 via the auxiliary secondary winding W2', as described herein.

At operation 430, the higher of the first and second voltages is selected and outputted to the controller. For example, the selector 240 selects the higher voltage between the first voltage $V_2$ and the second voltage $V_3$, and outputs the selected voltage to the controller 140, as described herein.

The above method(s) include(s) example operations, which are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, an AC-DC power converter comprises a rectifying unit, an output stage, a controller and a start-up circuit. The rectifying unit is configured to rectify an AC voltage to a rectified voltage. The an output stage is coupled to the rectifying unit and is configured to convert the rectified voltage into a DC voltage for a load. The controller is coupled to the output stage and is configured to control the output stage. The start-up circuit comprises a first power section coupled to the rectifying unit and configured to generate a first voltage from the rectified voltage and to output the first voltage to the controller to enable the controller before the output stage starts outputting power. The first power section comprises a depletion mode transistor having a first terminal configured to receive the rectified voltage and a second terminal configured to output the first voltage.

According to some embodiments, a start-up circuit for a power converter comprises an input node, an output node, a reference node a depletion mode FET, a first diode, a first capacitor and first and second resistors. The FET has a first terminal coupled to the input node, a second terminal coupled to the output node, and a gate terminal. The first diode has a cathode coupled to the gate terminal of the FET, and an anode coupled to the reference node. The first diode is a zener diode. The first capacitor is coupled in parallel with the first diode. The first resistor is coupled between the gate terminal of the FET and the input node. The second resistor is coupled between the second terminal of the FET and the reference node.

According to some embodiments, in a method of starting-up a power converter, an AC rectified voltage is generated upon power-up of the power converter. A depletion mode FET generates a first voltage from the rectified voltage. The controller is enabled by the first voltage before an output stage of the power converter starts outputting power from the rectified voltage. The enabled controller controls the output stage to output power. A second voltage is generated from the power supplied by the output stage. The higher of the first and second voltages is selected and outputted to the controller.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An AC-DC power converter, comprising:
   a rectifying unit configured to rectify an AC voltage to a rectified voltage;
   an output stage coupled to the rectifying unit and configured to convert the rectified voltage into a DC voltage for a load;
   a controller coupled to the output stage and configured to control the output stage; and
   a start-up circuit comprising a first power section which is coupled to the rectifying unit and configured to generate a first voltage from the rectified voltage and to output the first voltage to the controller to enable the controller before the output stage starts outputting power;
   a second power section coupled to the output stage and configured to generate a second voltage from power supplied by the output stage after the output stage starts operating; and
   a selector coupled to the first and second power sections and configured to select and output the higher of the first and second voltages to the controller;
   wherein the first power section comprises a depletion mode transistor having a first terminal configured to receive the rectified voltage and a second terminal configured to output the first voltage.

2. The AC-DC power converter of claim 1, wherein the second power section comprises a diode and a capacitor coupled in series between the output stage and a reference node having a reference voltage.

3. The AC-DC power converter of claim 1, wherein the selector comprises:
   at least one diode coupled between the controller and the first power section; and
   at least one further diode coupled between the controller and the second power section.

4. The AC-DC power converter of claim 1, wherein the depletion mode transistor is configured as a source follower.

5. The AC-DC power converter of claim 1, wherein the depletion mode transistor has a gate terminal configured to be biased by a constant voltage.

6. The AC-DC power converter of claim 1, wherein
   the depletion mode transistor has a gate terminal; and
   the first power section further comprises a first diode, which is a zener diode, coupled between the gate terminal of the depletion mode transistor and a reference node having a reference voltage.

7. The AC-DC power converter of claim 6, wherein the first power section further comprises a first capacitor coupled in parallel with the first diode.

8. The AC-DC power converter of claim 7, wherein the first power section further comprises:
   a first resistor and a second diode coupled in series between the rectifying unit and the gate terminal of the depletion mode transistor; and
   a second resistor coupled between the second terminal of the depletion mode transistor and the reference node.

9. The AC-DC power converter of claim 1, wherein the depletion mode transistor is an n-type depletion mode transistor.

10. A power converter, comprising:
    a rectifying circuit;
    an output stage coupled to an output of the rectifying circuit;
    a controller coupled to a control node of the output stage; and
    a start-up circuit comprising:

an input node coupled to the output of the rectifying circuit;

an output node coupled to an input of the controller;

a reference node;

a depletion mode field-effect transistor (FET) having a first terminal coupled to the input node, a second terminal coupled to the output node, and a gate terminal configured to receive a gate voltage;

a first diode having a cathode coupled to the gate terminal of the FET and an anode coupled to the reference node, wherein the first diode is a zener diode;

a first capacitor coupled in parallel with the first diode;

a first resistor coupled between the gate terminal of the FET and the input node; and a second resistor coupled between the second terminal of the FET and the reference node, wherein the first diode and the first resistor are configured to establish the gate voltage between the first diode and the first resistor by a current flowing through the first resistor.

11. The power converter of claim 10, the start-up circuit further comprising:

a second capacitor coupled between the output node and the reference node.

12. The power converter of claim 11, the start-up circuit further comprising:

a second diode coupled between the gate terminal of the FET and the input node.

13. The power converter of claim 12, the start-up circuit further comprising:

a third diode having a cathode coupled to the output node and an anode coupled to the second terminal of the FET.

14. The power converter of claim 13, the start-up circuit further comprising:

a fourth diode having a cathode coupled to the output node.

15. The power converter of claim 14, the start-up circuit further comprising:

a fifth diode having a cathode coupled to an anode of the fourth diode, and an anode configured to receive power; and a third capacitor coupled between the cathode of the fifth diode and the reference node.

16. The power converter of claim 10, wherein the FET is an N-channel depletion mode FET.

17. The power converter of claim 10, wherein the FET has a voltage rating of 400 to 800 V.

18. The power converter of claim 10, wherein the gate voltage is a constant voltage.

19. A method of starting-up a power converter, the method comprising:

generating an AC rectified voltage upon power-up of the power converter;

generating, by a depletion mode field-effect transistor (FET), a first voltage from the rectified voltage;

enabling, by the first voltage, a controller of the power converter before an output stage of the power converter starts outputting power;

controlling, by the enabled controller, the output stage to output power;

generating a second voltage from the power supplied by the output stage; and selecting and outputting the higher of the first and second voltages to the controller.

20. The method of claim 19, wherein the first voltage supplied to the controller during a first rising edge of the rectified voltage is sufficient to enable circuitry of the controller that monitors the rectified voltage.

* * * * *